United States Patent [19]

Sakai et al.

[11] 4,361,394
[45] Nov. 30, 1982

[54] METHOD AND APPARATUS FOR SCANNING LIGHT BEAM

[75] Inventors: Yukio Sakai; Fumio Yamazaki, both of Hirakata; Isao Satoh, Neyagawa, all of Japan

[73] Assignee: Matsushita Electric Industrial Co., Ltd., Kadoma, Japan

[21] Appl. No.: 285,319

[22] Filed: Jul. 22, 1981

[30] Foreign Application Priority Data

Jul. 25, 1980 [JP] Japan .............................. 55-102716

[51] Int. Cl.³ ........................................... G03G 15/00
[52] U.S. Cl. ................................ 355/3 R; 355/14 E; 355/8; 355/35
[58] Field of Search .................... 355/1, 35, 3 R, 14 R, 355/14 E, 8; 354/56, 60 R, 60 L

[56] References Cited

U.S. PATENT DOCUMENTS

| | | | |
|---|---|---|---|
| 3,788,739 | 1/1974 | Coriale | 355/14 E |
| 3,926,518 | 12/1975 | Berry et al. | 355/14 E X |
| 4,017,180 | 4/1977 | Yen et al. | 355/68 |
| 4,101,216 | 7/1978 | Grossman | 355/35 |
| 4,153,364 | 5/1979 | Suzuki et al. | 355/14 E |
| 4,215,924 | 8/1980 | Matsumoto | 355/1 X |
| 4,239,374 | 12/1980 | Tatsumi et al. | 355/14 E |
| 4,256,401 | 3/1981 | Fujimura et al. | 355/67 X |

Primary Examiner—A. C. Prescott
Attorney, Agent, or Firm—Cushman, Darby & Cushman

[57] ABSTRACT

In the method for scanning light beam in a xerographic recording using a laser light beam spots to scan on a photoreceptor the quality of the recorded image is improved by increasing size of the light beam spot when the irradiation spot scanning on the photoreceptor has neighboring spots to be irradiated. For detecting whether the neighboring spots are the spots to be irradiated or not, three shift registers 12, 13 and 14 and a NOR circuit 15 are used, and the output of the NOR circuit controls analog circuit 161 which switches amount of the laser current.

5 Claims, 11 Drawing Figures

METHOD AND APPARATUS FOR SCANNING LIGHT BEAM

BACKGROUND OF THE INVENTION

1. Field of the Invention

The present invention relates to an improvement in a method and apparatus for scanning light beam.

2. Description of the Prior Art

A xerographic apparatus which records images such as characters, numerals or patterns by irradiating light beam on a charged photosensitive substance, such as a laser printer is well known. The present invention relates to an improvement in method of irradiating the light beams on the photosensitive substance for improving picture quality by controlling diameters of the beam spots irradiated on the photosensitive substance.

FIG. 1 shows a sectional view showing an example of general structural configuration of the xerographic apparatus, which comprises a photoreceptor drum 1 rotating around a shaft 101, a pre-charger 2 for donating charges by a corona discharging onto the photoconductive layer 102 at the surface of the photoreceptor 1, a semi-conductor laser 3 capable of emanating modulated light, a collimeter lens 4 for making parallel light from the output light of the laser 3, a rotary polygonal mirror 5 driven by a motor 51, a focusing lens 6 for focusing light beam on the photoconductive layer on the photoreceptor 1, a developing means i.e., a tonor donating means 7 for donating negative-charged toner on the photoconductor layer 102, a transferring charger 8 for transferring toner from the photoreceptor onto the surface of a recording sheet 9, a mechanical toner cleaner 10 and an optical decharging lamp 11 for removing residual charge and toner. The apparatus of FIG. 1 operates as follows:

The semiconductor laser 3 emanates light modulated by a known measure of stop and feed laser current. The light passes through the collimator lens 4, is reflected by the rotary polygonal mirror 5, and through the converging lens 6 sweepingly irradiates the photoconductor layer 102 on the surface of the photo-receptor 1. By the rotation of the polygonal mirror 5, the light beam spot on the photoconductive layer 102 scans very fast widthwise of receptor drum 1, that is the direction of the sweeping of the light beam spot is substantially parallel to the axis of the photo-receptor drum 1. This widthwise scanning is hereinafter referred as main scanning, and a secondary scanning or sub-scanning is made by relative movement of the photoreceptor drum 1 around its axis, that is in the right angle to the main scanning line of light beam spot. The main scanning and the sub-scanning are represented as shown by FIG. 2, which schematically shows a small part of the surface of the photoconductive layer 102. At the exposure to the irradiation of light, the precharged photoconductor layer 102 loses charge at the light-exposed parts, thus forming latent image of charge on the photoconductor layer 102. The latent image is then developed by known tonor device 7 which for example comprises known magnetic brush.

In actual recording by the above-mentioned xerographic apparatus, due to slight differences between vertical angles of mirros of the polygonal mirror, the vertical positions of the scanning lines are likely to fluctuate up and down, thereby making the vertical pitches of the scanning lines uneven. Due to this unevenness of the subscanning, in case of positive developing, wherein parts not exposed to the light beam spots are developed black, such uneveness of the sub-scanning makes undesirable black horizontal lines as shown in FIG. 5 which is not in the original image.

SUMMARY OF THE INVENTION

The present invention can improve the picture quality of the image by adopting an improved method of scanning.

More particularly, the present invention can eliminates generation of the undesirable black lines on reproduced images by selectively enlarging sizes of the irradiating light beam spots for elected parts.

DESCRIPTION OF PREFERRED EMBODIMENT

The method for scanning light beam in a xero-graphic recording in accordance with the present invention comprises:

the step of precharging a photoreceptor, the step of exposuring the photoreceptor to spots of light beam scanning on the photoreceptor forming desired pattern thereby to form a latent image on the photoreceptor, developing the latent image thereby producing visible image, characterized in that the method comprises the steps of memorizing at least a first image information of one neighboring picture element with respect to a selected picture element in a main scanning direction, and a second image information of one neighboring picture element with respect to the selected picture element in a sub-scanning direction, issuing a correlation output which is produced when the first image information and the second image information have a predetermined relation to that of the selected picture element, increases size of spots of light beam of the selected picture elements when a predetermined correlation output is issued, and carrying out the steps in turn, shifting the selected picture elements in a predetermined scanning order on the photoreceptor.

Figure 3:
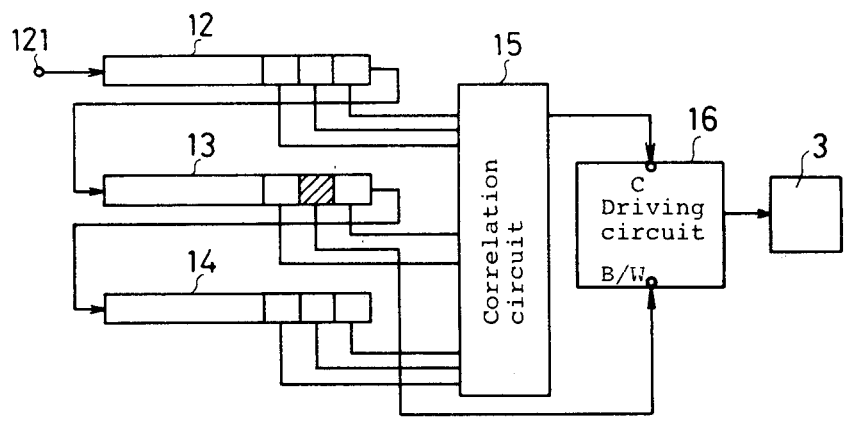
FIG. 3 is a block diagram of an example of control circuit for controlling diameter of light beam spots.

FIG. 3 shows a circuit configuration of a principal part of an example of the apparatus of the present invention.

Figure 1:
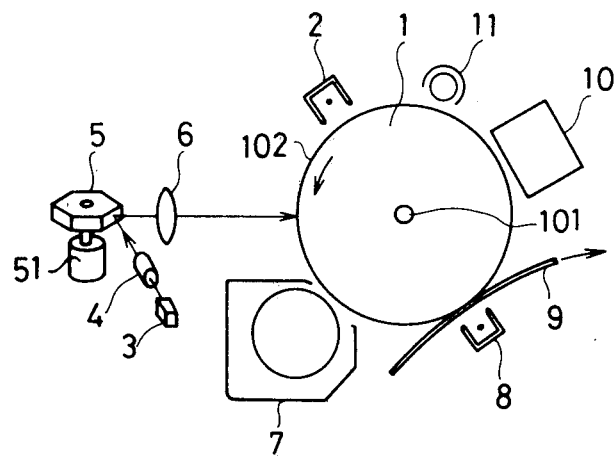
FIG. 1 is a sectional view of an example of a general structural configuration of a zerographic apparatus.
Figure 2:
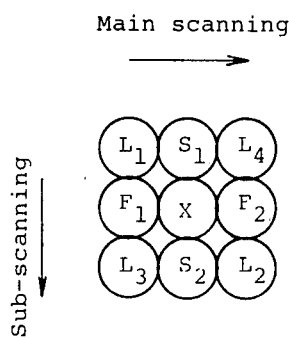
FIG. 2 is a schematic drawing showing way of scanning of a light beam to form an image.

Input signal terminal 121 of a first shift register 12 receives a video-signal corresponding to a desired pattern image, and the video-signal is memorized in the shift registers 12, 13 and 14. The shift registers 12, 13 and 14 are designed to store three lines of video-signals. The first shift register 12 is for storing information of one line preceding to a selected picture element for scanning now on the photoreceptor. The second shift register 13 is for storing information of the now-selected picture elements. The third shift register 14 is for storing information of the information of one line later. The correlation circuit 15 issues output by processing outputs of the shift registers 12, 13 and 14. For example, the correlation circuit 15 is designed to issue output when a selected picture element X as shown in FIG. 2 and all of eight neighboring picture elements $F_1$ and $F_2$ in the main scanning direction and neighboring picture elements $S_1$ and $S_2$ in the sub-scanning direction are irradiated by the light and gives its correlation output signal to a control input terminal C of the driving circuit 16 for the semiconductor laser 3. The output signal of the shift register 13 is given to the input terminal B/W of the driving circuit 16. Accordingly, the circuit 16 outputs driving current to be fed to the laser 3 in a manner that:

the current flows and ceases responding to "1" and "0" of the input signal to the input terminal B/W of the driving circuit 16 and the intensity of the current is increased when the correlation output signal is given to the input terminal C of the driving circuit 16, thereby to enlarge the diameter of the light beam spot of laser light.

Figure 4A:
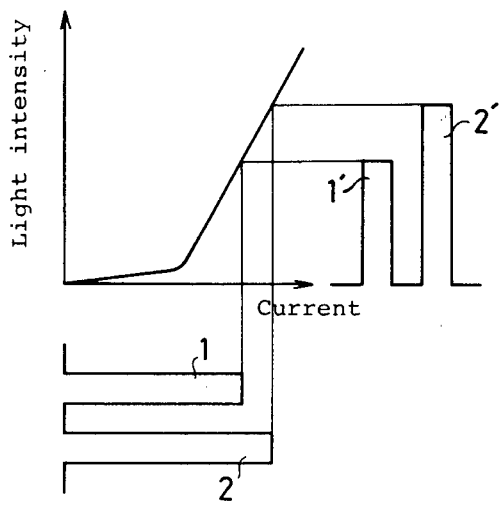
FIG. 4(a) is a graph showing relation between input current and output light intensity of a semiconductor laser.
Figure 4B:
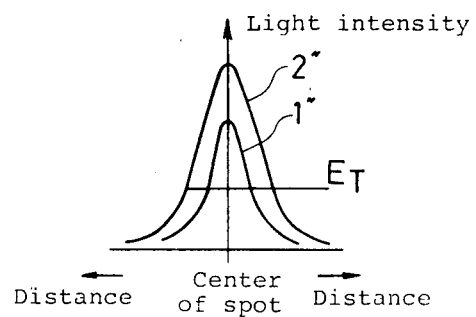
FIG. 4(b) is a graph showing relation between light intensity and distance from the center of the light beam spot.

The principle of controlling the diameter of the light beam spot is elucidated referring to FIG. 4 (a) and FIG. 4(b). When the current to the laser 3 is increased from the level of 1 to the level of 2 in FIG. 4(a), the light output of the laser 3 is increased from the lower intensity of level 1' to the higher intensity of level 2' of FIG. 4(a). As the light intensity level increases, the distribution curve of the light intensity vs. distance from the center of the light beam spot to the periphery of the white spot obtained by the development of the latent image made by irradiation of the light beam spot changes from that of curve 1" to that of curve 2" of FIG. 4(b). The diameter d of the recorded spot is given by the following equation (1):

$$d = a \sqrt{\ln(Po/b \cdot E_T)} \quad (1)$$

where: a and b are constant specific to the conditions of recording, and

Po ... is the light intensity $E_T$ ... is thereshold exposure necessary for the recording on the photoreceptor.

Accordingly, as is obvious from the equation (1), the diameter d of the recorded spot, which is ordinarily a white spot formed by irradiation by the light beam spot, is increased by increasing the intensity of the laser light.

Figure 6:
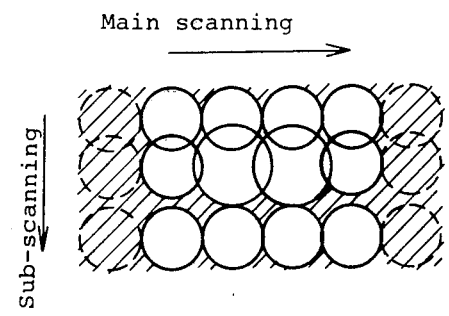
FIG. 6 is a view showing a part of recorded image which corresponds to that of FIG. 5, but wherein the undesirable black horizontal line is substantially eliminated by adopting an improvement in accordance with the present invention.

FIG. 6 schematically shows an embodiment which can improve the picture quality of substantially eliminating the undesirable horizontal black line by increasing the diameters of the irradiation spots which is encircled by other irradiation spots.

In FIG. 6, the diameter of the selected spot is increased when another buffer irradiation spot lies between the dark spot and the selected spot. Providing of such buffer irradiation spot is necessary in order not to thin or erase the black line by superposing a peripheral part of the irradiation spot of the increased diameter. In order to provide such buffer irradiation spots to encircle the selected spot, at least the horizontally neighboring spots (picture elements) in the main scanning direction (horizontal direction) and vertically neighboring spots (picture elements) in the sub-scanning direction (vertical direction) are examined whether these spots are irradiated or not. This is done by the circuit of FIG. 8 which examines states of the four neighboring spots (picture elements); operation of the circuit of FIG. 8 will be elucidated later. In order to obtain better quality of the recorded picture, besides the neighboring spots (picture elements) in the above-mentioned two directions, further four neighboring spots (picture elements) in two oblique directions, that is intermediate between the main scanning direction and the sub-scanning direction are examined. This latter case is done by the circuit of FIG. 10, which examines states of the eight neighboring spots (picture elements); operation of the circuit of FIG. 10 will be elucidated later.

Any way, by means of the increasing of the diameter of spots the undesirable black lines are substantially eliminated. Though a short black line under the encircling spots will be retained even in adoption of the method of the present invention, length of this black line is only 100 μm or less, and hence, substantially no influence is noticeable.

Figure 7:
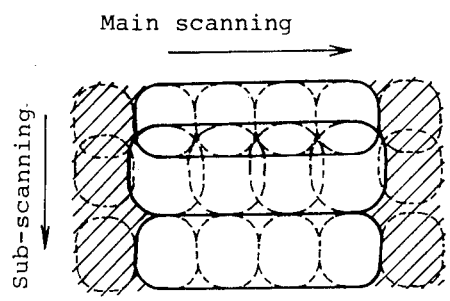
FIG. 7 is a view showing a part of recorded image which corresponds to that of FIG. 5, but wherein the undesirable black horizontal line is substantially eliminated in accordance with a modified example.

However, the short black line neighboring to the black spot is further removed by the following modified way of the scanning. FIG. 7 shows such modified example where the spot is vertically oblong, that is the size in the sub-scanning direction (vertical direction) is larger than the size in the main scanning direction. Since the ordinary semiconductor laser generally has an elliptic light beam section and therefore, such oblong spot is easily obtainable. And the spot sweeps in the main scanning direction, continuing irradiation during the sweeping. Therefore, the irradiation spots become horizontally oblong without discretions at horizontal length of every picture element. By use of the scanning in such sweeping way as continuously retaining light and continuously scanning, and by simultaneously adopting the aforementioned increase of the spot sizes by means of increasing the input current to the laser as shown in FIG. 7, the black line due to unevenness of the subscanning pitch can be almost completely eliminated. In this method, since the irradiated spot is vertically oblong, the thinning of the vertical black line is minimized negligibly small.

Figure 8:
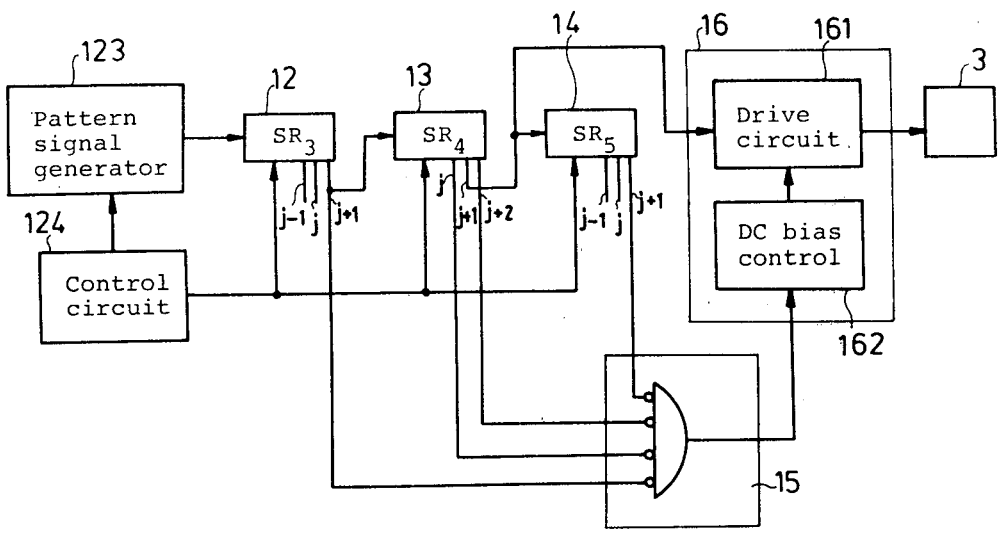
FIG. 8 is a detailed circuit diagram of the example of FIG. 3.
Figure 9:
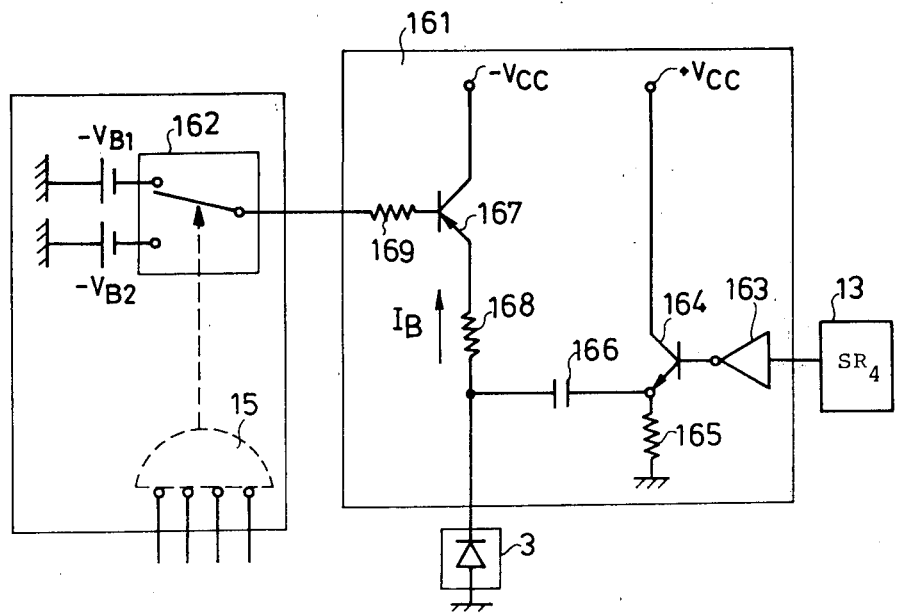
FIG. 9 is a detailed circuit diagram of a part of the circuit of FIG. 8.

FIG. 8 is an example of a detailed circuit configuration of the circuit of FIG. 3. Numeral 123 designates pattern signal generator circuit which serially outputs data in a the direction of the main scanning. White picture elements correspond to "0" signals, and black picture elements correspond to "1" signals. The outputs of the pattern signal generator 123 is controlled by a control circuit 124. The numeral 12 designate a shift register having j+1 bits which is the number of bits of one line of the main scanning, and its output is taken out from the j+1 bit output terminal. Numeral 13 designates a shift register to which j+1 bit output of the shift register 12 is given. The shift register 13 has bit number of j+2, and its outputs are issued from the terminals for j bit, j+1 bit and j+2 bit. Numeral 14 is a shift register having a bit capacity of j+1 and output of j+1 bit of the shift register 13 is input thereto. Numeral 161 designates a drive circuit for the semiconductor laser, and its detailed configuration is shown in FIG. 9. The j+1 bit output terminal of the shift register 13 is connected to the drive circuit 161. Numeral 15 designates a NOR circuit functioning as a correlation circuit and has four input terminals. The input terminals are connected to the j+1 bit output terminal of the shift register 12, j bit output terminal and j+2 bit output terminal of the shift register 13 and j+1 bit output terminal of the shift register 14. The output terminal of the NOR gate 15 is connected to the DC bias control circuit 162 of the drive circuit.

The details of the DC bias control circuit 162 and the drive circuit for the semiconductor laser 3 are shown in FIG. 9. The output terminal of the NOR gate 15 is connected to the analog switch 162, so that it is switched to $-V_{B2}$ when the output of the NOR gate 15 is "1" and to $-V_{B1}$ when the output is "0", where the relation is $V_{B1} < V_{B2}$. Numeral 167 is a transistor for setting a bias of the semiconductor laser 3. Numeral 163 is an input gate for the inputting driving signal of the semiconductor laser 3, and j+1 bit output of the shift register 13 is given thereto. Numeral 164 is a transistor for driving the signal.

Figure 5:
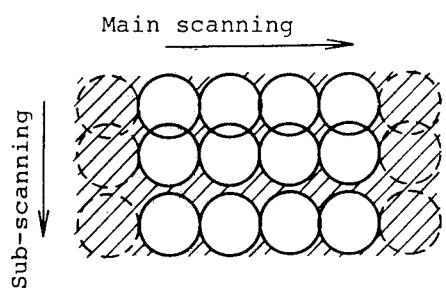
FIG. 5 is a view showing a part of recorded image including undesirable black horizontal line in the image.

In making change of light output of the laser 3 by the above-mentioned circuit configuration, when the analog switch 162 is switched to $-V_{B1}$, the current flowing in the semiconductor laser 3 is determined by a smaller bias current $I_{B1}$, and when the analog switch 162 is switched to $-V_{B2}$, the current flowing in the semiconductor laser 3 is determined by a larger bias current $I_{B2}$. And therefore, as shown by FIG. 4(b), the light intensity is switched between the curves 1" and 2". As a result of the abovementioned configuration, where the spot (picture element) itself is white and the neighboring spots (picture elements) in the direction of the main scanning and in the direction of the sub-scanning are all irradiated (corresponding to white), then the diameter of the laser beam is increased since the output of the NOR circuit 15 becomes "0" and hence the analog switch 162 is switched to $V_{B2}$. Therefore, as is obvious from FIG. 6, the hitherto generated undesirable black line shown in FIG. 5 is eliminated.

Figure 10:
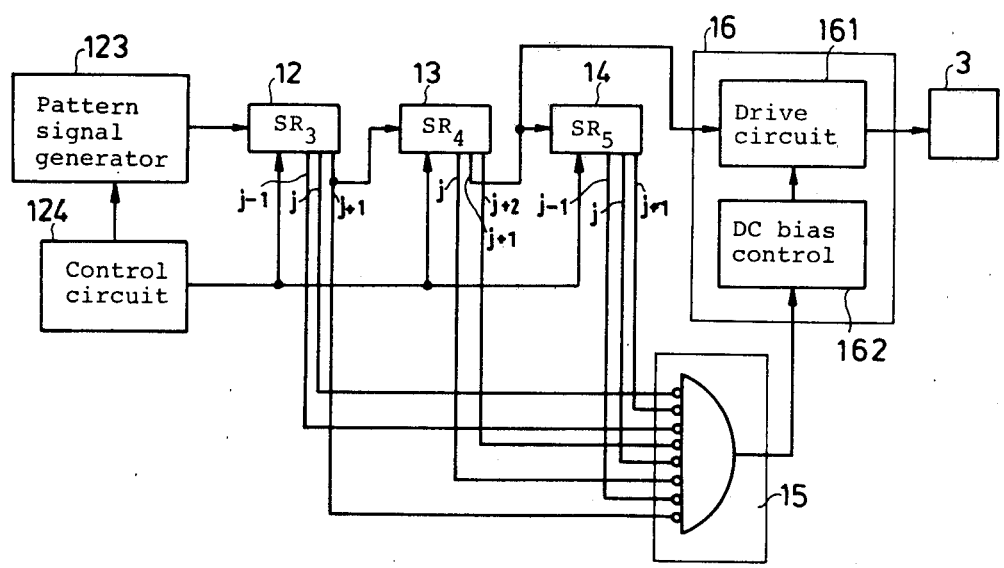
FIG. 10 is a detailed circuit diagram of a modified circuit of the example of FIG. 3.

FIG. 10 is a circuit diagram of another example, which is a modification of the example of FIG. 8. The difference is that the NOR circuit 15 has eight input terminals in total in order than a more detailed correlation with neighboring spots is obtained by the NOR circuit 15. Accordingly, the condition to increase the diameter of the spot is further limited by the conditions of the neighboring spots in the oblique directions which are between the main scanning direction (horizontal direction) and the sub-scanning direction (vertical direction). Therefore, better quality of the recorded picture is obtainable.

What is claimed is:

1. Method for scanning light beam in a xerographic recording comprising the steps of precharging a photoreceptor, said photoreceptor to spots of light beam scaning on said photoreceptor for a desired pattern thereby to form a latent image on said photoreceptor, developing said latent image thereby producing visible image, characterized in that the method comprises the steps of memorizing at least a first image information of one neighboring picture element with respect to a selected picture element in a main scanning direction, and a second image information of one neighboring picture element with respect to the selected picture element in a sub-scanning direction, issuing a correlation output which is produced when said first image information and said second image information have a predetermined relation to that of said selected picture element, increasing the size of the spots of light beam of said selected picture elements when a predetermined correlation output is issued, carrying out said steps in turn, and shifting said selected picture elements in a predetermined scanning order on said photoreceptor.

2. Method for scanning light beam in a xerographic recording in accordance with claim 1, wherein
said first information and said second information are that all of said neighboring picture elements and said selected picture element are irradiated by light beam spots.

3. Method for scanning light beam in a xerographic recording in accordance with claim 1, wherein
said issuing of correlation output is produced when, futhermore, a third and fourth image information of at least one obliquely neighboring picture elements with respect to said selected picture element in each of two intermediate oblique directions, which are between said main scanning direction and said sub-scanning direction, has predetermined relations to that of said selected picture element.

4. Method for scanning light beam in a xerographic recording in accordance with claim 3, wherein
said third image information and said fourth image information are that all of said obliquely neighboring picture elements and selected picture elements are irradiated by light beam spots.

5. Method for scanning light beam in a xerographic recording in accordance with claim 1, wherein
said spots of light beam have a longer size in the sub-scanning direction than in the main scanning direction, and
said issuing of correlation output is produced when said second-image information is that all of neighboring picture elements and said selected picture element are irradiated by light beam spots.

* * * * *